United States Patent
Dussaume et al.

(10) Patent No.: US 12,184,342 B2
(45) Date of Patent: Dec. 31, 2024

(54) METHOD FOR VALIDATING A TRANSACTION DURING A RADIO COMMUNICATION

(71) Applicant: Orange, Issy-les-Moulineaux (FR)

(72) Inventors: Philippe Dussaume, Chatillon (FR); Jean-Philippe Javaudin, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/770,844

(22) PCT Filed: Oct. 6, 2020

(86) PCT No.: PCT/FR2020/051746
§ 371 (c)(1),
(2) Date: Apr. 21, 2022

(87) PCT Pub. No.: WO2021/079038
PCT Pub. Date: Apr. 29, 2021

(65) Prior Publication Data
US 2022/0376798 A1   Nov. 24, 2022

(30) Foreign Application Priority Data
Oct. 24, 2019   (FR) ........................................ 1911932

(51) Int. Cl.
*H04B 13/00*   (2006.01)
(52) U.S. Cl.
CPC .................................. *H04B 13/005* (2013.01)
(58) Field of Classification Search
CPC .................................................. H04B 13/005
See application file for complete search history.

(56) References Cited

U.S. PATENT DOCUMENTS

| 2015/0261342 A1* | 9/2015 | Hsu | ......................... G06F 3/044 345/174 |
| 2020/0295847 A1 | 9/2020 | Levionnais et al. | |

FOREIGN PATENT DOCUMENTS

| EP | 3257004 A1 | 12/2017 |
| JP | 5358771 B2 | 12/2013 |

(Continued)

OTHER PUBLICATIONS

English translation of the Written Opinion of the International Searching Authority dated Jan. 29, 2021 for corresponding International Application No. PCT/FR2020/051746, filed Oct. 6, 2020.

(Continued)

*Primary Examiner* — Hsinchun Liao
(74) *Attorney, Agent, or Firm* — David D. Brush; Westman, Champlin & Koehler, P.A.

(57) ABSTRACT

A method for receiving a signal during an intra-body communication via a user carrying a terminal. The method includes, at the level of the terminal: receiving, from a communication device, a signal characterizing the fact that an approach gesture performed by the user toward the device has been performed between two times; detecting the time interval, between the two times, in which the amplitude of the signal is at a maximum; detecting, in the time interval, information determining whether or not the user has touched the device between the two times; and validating a transaction depending on the value of said detected information.

9 Claims, 4 Drawing Sheets

(56) References Cited

FOREIGN PATENT DOCUMENTS

| | | |
|---|---|---|
| WO | 2012131224 A1 | 10/2012 |
| WO | 2016001506 A1 | 1/2016 |
| WO | 2016128805 A1 | 8/2016 |
| WO | 2019063902 A1 | 4/2019 |

OTHER PUBLICATIONS

International Search Report dated Jan. 13, 2021 for corresponding International Application No. PCT/FR2020/051746, Oct. 6, 2020.
Written Opinion of the International Searching Authority dated Jan. 13, 2021 for corresponding International Application No. PCT/FR2020/051746, filed Oct. 6, 2020.

* cited by examiner

METHOD FOR VALIDATING A TRANSACTION DURING A RADIO COMMUNICATION

CROSS-REFERENCE TO RELATED APPLICATIONS

This Application is a Section 371 National Stage Application of International Application No. PCT/FR2020/051746, filed Oct. 6, 2020, which is incorporated by reference in its entirety and published as WO 2021/079038 A1 on Apr. 29, 2021, not in English.

FIELD OF THE INVENTION

The invention relates to short-range wireless communications for transmitting data between two devices by way of the human body. More precisely, the invention relates to a system for conducting transactions between a terminal carried by a user and a communication device such as a base station or a reader, connected for example to a transaction server, using the conductive capability of the human body to transmit the electromagnetic waves carrying such wireless communications.

PRIOR ART

Near-field communications, usually known by the acronym "NFC", based mainly on the ISO (International Organization for Standardization) 14443 standard, use wireless technologies to allow information to be exchanged between two peripherals separated by a short distance, typically less than ten centimeters. Communications of this type have many applications, for example in the fields of payment or transportation. The near-field receiver receives a message from the near-field transmitter. Such a message may correspond, in the abovementioned context, to the validation of a transaction, such as for example the exchange of a ticket (for an event, for travel, etc.), a payment, the launch of a personalized service on a computer or a television set, access to a room, etc.

The prior art discloses a system for exchanging such messages, in which the receiver is contained in a terminal carried by a user, the messages being received by the receiver during an intra-body communication via the user of the terminal. An intra-body communication uses the conductive capability of the human body to transmit the electromagnetic waves carrying wireless communications. Such a technology is called intra-body communication (IBC).

Such a wireless communication system is described for example in document WO2012/131224. The system comprises a terminal carried by a user, the antenna of which is in direct contact with, or very close to, the user. A signal transmitted by the terminal is modulated by way of a low-frequency modulator and transmitted through the body of the user. Indeed, it is known that the human body has conduction capabilities that are suitable for conveying such electromagnetic signals, provided that the antenna is located close to (less than a few centimeters from) the body of the user and designed so as to meet the expected objective. To this end, the antenna consists of a set of turns of a number and arrangement that are appropriate for transmitting the wave through the human body in an optimum manner. This system according to the prior art also comprises an NFC communication device comprising a receiver that comprises a sensitive surface consisting of an antenna of the same type as that of the transmitter and on which the user is able to perform an approach gesture, for example place his hand on the antenna, touch it or simply bring his hand toward the antenna to within a few centimeters thereof. The NFC communication device receives the signal due to the physical contact between, or at least the proximity of, the user and the antenna. The received signal is demodulated and transmitted to an equipment suitable for performing processing operations, in the present case for carrying out the transaction (payment, opening a door, etc.).

In order to secure this type of transaction, document WO2016/001506 proposes to detect and validate an intentional approach gesture performed by the user, in order to ensure that the approach gesture is actually performed. The drawback of such a system lies in the fact that, in the presence of multiple communication devices located close to the terminal of the user, even if the user performs an intentional approach gesture with respect to a first communication device, but not with respect to a second communication device, the transaction may fail if the signal received by the terminal of the user through intra-body communication, from the second communication device, has a power higher than that of the signal characterizing the intentional approach gesture performed by the user, received through intra-body communication from the first device.

Indeed, it is the frame contained in the signal transmitted by this second communication device that will be decoded by the terminal of the user, and not the data frame contained in the less powerful signal characterizing the approach gesture performed by the user, as transmitted by the first communication device.

The terminal of the user will thus be able, via a dedicated application, to detect the intentional approach gesture performed by the user with respect to the first communication device, by analyzing the evolution of the envelope of the received NFC signal, but risks incorrectly associating this envelope with an approach of the second communication device in connection with the decoding of the frames received therefrom.

The transaction between the terminal and the first communication device will therefore be unsuccessful.

Aim and Summary of the Invention

One of the aims of the invention is to rectify drawbacks of the abovementioned prior art.

To this end, one subject of the present invention relates to a method for receiving a signal during an intra-body communication via a user carrying a terminal, comprising the following, at the level of the terminal:
  receiving, from a communication device, a signal characterizing the fact that an approach gesture performed by the user toward the device has been performed between two times,
  detecting the time interval, between the two times, in which the amplitude of the signal is at a maximum.

Such a method is noteworthy in that it comprises the following, at the level of the terminal:
  detecting, in the time interval, information determining whether or not the user has touched the device between the two times,
  validating a transaction depending on the value of said detected information.

Such a reception method according to the invention thus allows the terminal carried by the user to check, from among the data frames that it receives through intra-body communication, from multiple communication devices located close to the terminal, whether or not one of these devices has been touched by the user, and to validate a transaction via either the communication device that the user has actually touched, or another nearby terminal, or else, by contrast, to decline any transaction if the terminal receives, from each of them, explicit information according to which none of these devices has been touched by the user.

The invention thus very easily makes it possible, by virtue of a modification of the signal characterizing the approach gesture performed by the user, by adding information determining whether or not the user has touched the device between the two times, to verify, by way of a terminal carried by the user, which device is the one that has actually been touched by the user of the terminal. Furthermore, by correlating this information that is temporally close to the maximum amplitude of the signal characterizing the fact that the user has touched the device between the two times, the terminal is able to recognize, with a high probability, which device, from among the communication devices located close to the terminal, is the communication device via which a transaction required by the terminal will be able to be implemented.

Intra-body communication is understood to mean a communication that uses the conductive capability of the human body to transmit the electromagnetic waves carrying wireless communications. Such technology is called IBC.

According to one particular embodiment, the information determining whether or not the user has touched the device is contained in a radio data frame received from the communication device, said frame being associated with the time interval in which the amplitude of the signal is at a maximum.

By virtue of the reception of the radio data frame that contains said information, in synchronicity with the reception of the signal characterizing the fact that the user has touched the device between two times, and more precisely in the time interval between the two times, in which the amplitude of the signal is at a maximum, the terminal is able to very easily correlate the identity, and therefore the location of the device, with radio data of the received frame that have been generated by the device, such as for example an identifier of the terminal, a service identifier, a random datum, etc.

According to another particular embodiment, the information determining whether or not the user has touched the device is contained in a radio data frame received from the communication device, said frame being associated with the time interval in which the amplitude of the signal is at a maximum, and wherein said frame is distinct from another radio data frame received from the communication device and associated with the time interval in which the amplitude of the signal is at a maximum.

By virtue of the reception of the radio data frame that contains said information, in synchronicity with the reception of the signal characterizing the fact that the user has touched the device between two times, and more precisely in the time interval between the two times, in which the amplitude of the signal is at a maximum, the terminal is able to very easily correlate the identity, and therefore the location of the device, with radio data of another frame that have been generated by the device, said other frame being received in parallel by the terminal, also between the two times during which the user has touched the device. Such radio data contained in this other frame comprise for example an identifier of the terminal, a service identifier, a random datum, etc.

According to another particular embodiment, the information determining whether or not the user has touched the communication device comprises a bit whose first value determines that the user has touched the communication device, and whose second value determines that the user has not touched the communication device.

Representing the information determining whether or not the user has touched the device in binary form makes it possible to optimize the reduction of the signaling cost of the transmission of the radio data frames between the communication device and the terminal.

The various abovementioned embodiments or implementation features may be added, independently or in combination with one another, to the reception method defined above.

The invention also relates to a terminal having capabilities for intra-body communication via a user carrying said terminal, said terminal comprising a processor that is configured so as to implement the following:
  receive, from a communication device, a signal characterizing the fact that an approach gesture performed by the user toward the device has been performed between two times,
  detect the time interval, between the two times, in which the amplitude of the signal is at a maximum.

Such a terminal is noteworthy in that the processor is configured so as to implement the following:
  detect, in the time interval, information determining whether or not the user has touched the device between the two times,
  validate a transaction depending on the value of said detected information.

Such a communication terminal is in particular able to implement the abovementioned reception method.

The invention also relates to a method for transmitting a signal during an intra-body communication via a user carrying a terminal, comprising the following, at the level of a communication device:
  detecting an approach gesture performed by the user toward the communication device, said gesture being performed between two times,
  transmitting a signal characterizing the approach gesture to the terminal.

Such a transmission method is noteworthy in that the communication device generates, in the signal, information determining whether or not the user has touched the device.

According to one particular embodiment, the information determining whether or not the user has touched the device is contained in a radio data frame sent to the terminal, said frame having been generated between the two times at which the amplitude of the signal is at a maximum.

According to another particular embodiment, the information determining whether or not the user has touched the device is contained in a radio data frame sent to the terminal, said frame having been generated between the two times at which the amplitude of the signal is at a maximum, and wherein said frame is distinct from another radio data frame sent to the terminal and having been generated between the two times at which the amplitude of the signal is at a maximum.

According to another particular embodiment, the information determining whether or not the user has touched the communication device comprises a bit whose first value determines that the user has touched the communication device, and whose second value determines that the user has not touched the communication device.

The various abovementioned embodiments or implementation features may be added, independently or in combination with one another, to the transmission method defined above.

The invention also relates to a communication device having capabilities for signal transmission during an intrabody communication via a user carrying a terminal, said device comprising a processor that is configured so as to implement the following:

detect an approach gesture performed by the user toward the communication device, said gesture being performed between two times, transmit a signal characterizing the approach gesture performed by the user toward the device to the terminal.

Such a device is noteworthy in that the processor is configured so as to generate, in the signal, information determining whether or not the user has touched the device. The invention also relates to a computer program comprising instructions for implementing the reception or transmission method according to the invention according to any one of the particular embodiments described above when said program is executed by a processor.

Such instructions may be stored durably in a non-transitory memory medium of the communication terminal implementing the reception method or of the communication device implementing the transmission method.

This program may use any programming language and be in the form of source code, object code or intermediate code between source code and object code, such as in a partially compiled form, or in any other desirable form.

The invention also targets a computer-readable recording medium or information medium comprising instructions of a computer program as mentioned above.

The recording medium may be any entity or device capable of storing the program.

For example, the medium may comprise a storage means, such as a ROM, for example a CD-ROM or a microelectronic circuit ROM, or else a magnetic recording means, for example a USB key or a hard disk.

Moreover, the recording medium may be a transmissible medium such as an electrical or optical signal, which may be conveyed via an electrical or optical cable, by radio or by other means. The program according to the invention may in particular be downloaded from an Internet-type network.

As an alternative, the recording medium may be an integrated circuit in which the program is incorporated, the circuit being designed to execute or to be used in the execution of the abovementioned reception or transmission method.

BRIEF DESCRIPTION OF THE DRAWINGS

Other features and advantages will become apparent from reading particular embodiments of the invention, which are given by way of illustrative and non-limiting examples, and the appended drawings, in which.

DETAILED DESCRIPTION OF ONE EMBODIMENT OF THE INVENTION

Figure 1:
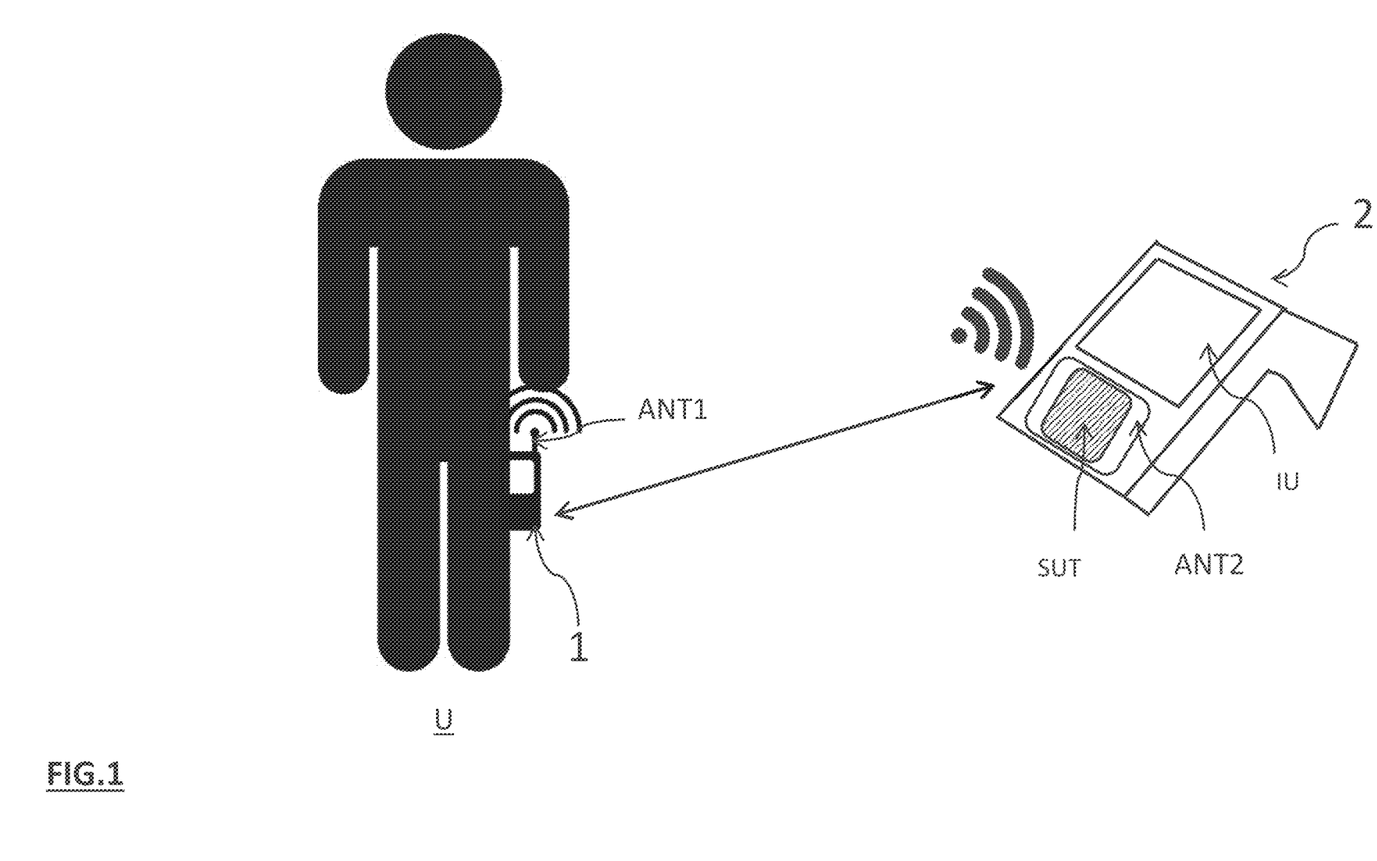
FIG. 1 shows a communication system according to one embodiment of the invention when a terminal carried by a user conducts a transaction with a communication device.

FIG. 1 shows a wireless communication system according to one embodiment of the invention.

Such a system comprises:

a terminal 1 carried by a user U, the terminal 1 being equipped with an NFC-IBC module (not shown) and an IBC antenna denoted by the reference ANT1, a communication device 2, such as for example a base station, or terminal, equipped with an NFC module.

The terminal 1 according to the invention is suitable for transmitting and receiving radio signals, which are also called radio carrier waves, via the antenna ANT1, through the body of a user U. To this end, the terminal 1 is located close to the user U, without necessarily being in direct contact therewith. For example, the terminal 1 is placed inside a pocket or a bag carried against the user. In these configurations, it is estimated that the terminal 1 is not more than a few centimeters away from the body of the user U. The distance is for example less than 10 cm. The terminal 1 is equipped with a battery or battery cells for autonomous operation. It is for example a mobile telephone equipped with an NFC antenna used as antenna for transmitting and receiving modulated or unmodulated electrical signals. In the context of this exemplary embodiment, and as already explained previously, the NFC antenna ANT1 is also IBC. To this end, the antenna ANT1 is designed so as to receive the electromagnetic wave through the human body in an optimum manner. For this purpose, it consists of a set of turns of an appropriate number and arrangement.

The terminal 1 may of course take other forms. For example, it may be any portable device capable of near-field communication with NFC transmitters, directly or via the human body (bracelet, electronic tablet, necklace, etc.).

The communication device 2 is an equipment that is able to transmit and receive radio signals, or carrier waves, in particular through the body of the user, via an IBC antenna, denoted by the reference ANT2. In this exemplary embodiment, the communication device 2 is a reader that comprises a sensitive surface SUT formed by the antenna ANT2, which is possibly protected and designed to react when the user touches it, for example by placing his hand above it, or approaching very close (a few centimeters). To this end, according to one exemplary embodiment, the sensitive surface SUT may be equipped with one or more capacitive detectors (not shown). Other touch or quasi-touch detection technologies may of course be implemented, such as for example surface wave technology, infrared technology, ultrasound technology, etc. The communication device 2 also comprises a user interface (also called HMI), referenced IU, intended to display messages for the attention of the user and an equipment (not shown in FIG. 1) able to perform processing operations, such as a PC or a server. The sensitive surface SUT covering the antenna, the user interface IU and the equipment are connected for example by way of a wired link, or through a network, for example a mobile network, or the Internet. The communication device 2 is configured so as to operate in IBC mode by loading a specific (software) program, without modifying the hardware.

According to one alternative embodiment, the communication device 2 consists of an electronic shelf label (ESL) that the user touches in order to receive personalized product information (discount, benefit, promotion, information about the product, etc.).

Description of One Embodiment of the Terminal 1

Figure 2:
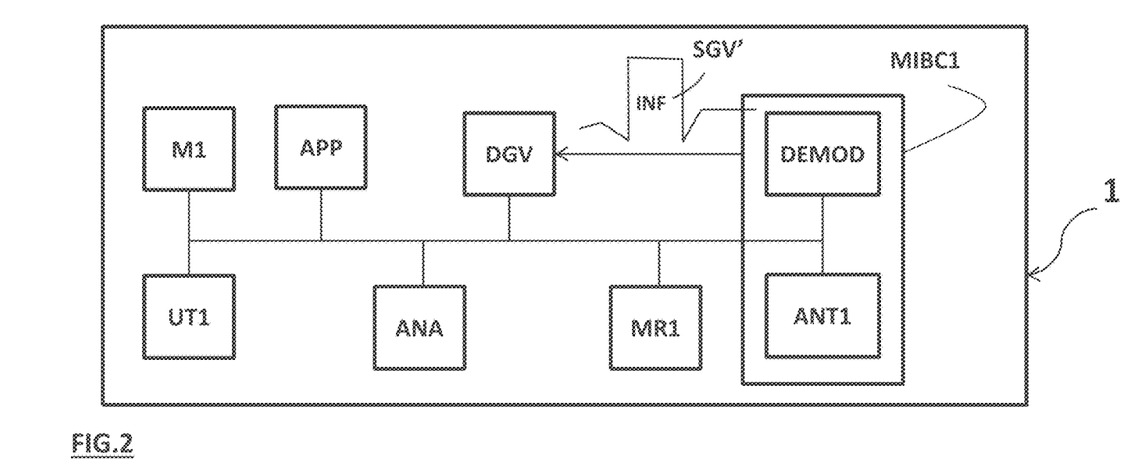
FIG. 2 shows a terminal in one particular embodiment of the invention.

FIG. 2 shows the simplified structure of the terminal 1 designed to implement the signal reception method that will be described below.

The terminal 1 is for example a smartphone mobile terminal designed to implement the invention. According to another example, the terminal is a simple electronic card equipped with the following modules:

- a processing unit, such as a processor or "CPU" (for "Central Processing Unit"), referenced UT1, intended to load instructions into memory, to execute them and to perform operations,
- a set M1 of memories, including a volatile memory, or "RAM" (for "Random Access Memory") used to execute code instructions, store variables, etc., and including a non-volatile memory such as a "ROM" ("Read Only Memory") or "EEPROM" (for "Electrically Erasable Programmable Read Only Memory") intended to contain persistent information, in particular the identification data for identifying the user UT,
- an IBC module, referenced MIBC1, including:
  - an antenna ANT1 designed in particular to receive signals over the radio channel and via the human body, such that a modulated electrical signal transported by the body of the user is able to be received by the antenna, which is located in the terminal, close to the human body;
  - a demodulator DEMOD, intended to receive, via the antenna, a modulated electrical signal and to transform it into a digital signal intended to be transmitted to the processing unit;
  - the software components (firmware, etc.) required to implement IBC communications;
- a Bluetooth or Wi-Fi radio module MR1 intended to transmit in particular data back from the terminal 1 to the device 2 or any other appropriate device,
- preferably, and in particular if the following modules are not implemented on another device:
  - an intentional gesture detection module, referenced DGV, for analyzing the signals received by the module MIBC1 and deciding whether or not they involve a signal SGV' corresponding to a movement comprising an intentional gesture performed by the user U;
  - an analysis module ANA for analyzing any signal received from a communication device 2, in particular following an intentional movement performed by the user, and detecting, in the time interval in which the amplitude of the received signal is at a maximum, whether the received signal is associated with information determining whether or not the user U has touched the device 2;
  - an application module APP for validating or not validating, depending on the value of the detected information, the appropriate transaction required by the terminal 1, either with the device 2, or with any other appropriate device/equipment.

Description of One Embodiment of the Communication Device 2

Figure 3:
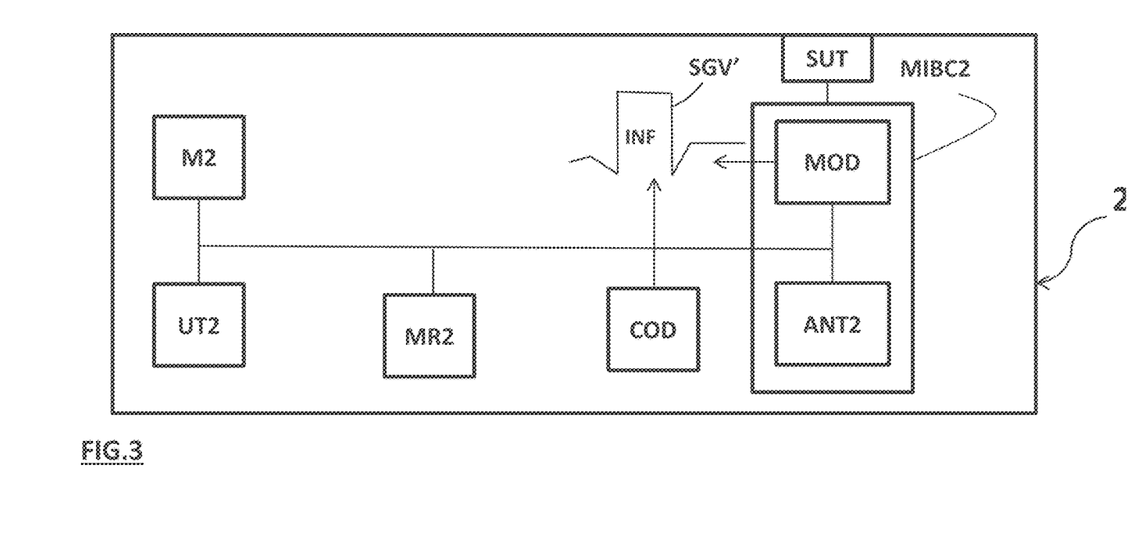
FIG. 3 shows a communication device in one particular embodiment of the invention.

FIG. 3 shows the simplified structure of the communication device 2 designed to implement the signal transmission method that will be described below.

The device 2 comprises multiple modules that are similar to those of the terminal 1 described with reference to FIG. 2:

- a processing unit, such as a processor or CPU, referenced UT2, used to execute code instructions, store variables, etc.,
- a set M2 of memories, including a volatile memory or "RAM" (for "Random Access Memory") used to execute code instructions, store variables, etc., and a non-volatile memory, such as a "ROM" or "EEPROM" intended to contain persistent information,
- an IBC module, referenced MIBC2, including:
  - an antenna ANT2, designed in particular to transmit signals over the radio channel and via the human body, and possibly to receive them;
  - a modulator MOD intended to adapt a digital signal produced by the processing unit UT2 into a modulated electrical signal SGV', intended to be transmitted, via the antenna ANT2, in particular through the body of the user. The modulation operation performed by the modulator is for example an amplitude modulation: the signal is a 13.56 MHz signal, amplitude-modulated with a modulation rate of approximately 10% (known characteristic of Type B according to the NFC standard). The invention is however not limited to this type of modulation. In another exemplary embodiment, the modulation is a frequency modulation, which is less sensitive to interference, or a phase modulation;
  - a sensitive/touch surface SUT designed to react when the user U touches it (contact, quasi-contact, touch, tap, etc.). In the example described here, this surface corresponds to the antenna, such that a modulated electrical signal transmitted via the antenna ANT2 is able to be conveyed by the body of the user U who touches the surface SUT. In one exemplary embodiment, the antenna may be integrated into the surface. The surface is designed so as to interact with the processing unit UT2 in order to implement the steps of the signal transmission method that will be described later on;
  - a coding module COD for generating information determining whether or not the user U has touched the device 2,
  - a Bluetooth or Wi-Fi radio module MR2 intended in particular to receive data in return from the terminal 1 (signals received by the terminal 1, data relating to the transaction, etc.) and/or to enter into contact with another device in order to validate the transaction (door, connected object, etc.),
  - the software components (firmware, etc.) required to implement IBC communications,
  - optionally a user interface (HMI) designed to transmit instructions or information messages to the user U. For example, the user interface is a screen on which the messages and instructions are displayed. In another exemplary embodiment, the interface is an audio interface for playing the messages and instructions, for example for telling the user that he may remove his hand from the surface SUT. The interface may also comprise a keypad, a microphone, etc.

It will be recalled that any off-the-shelf reader (for example an EPT for "electronic payment terminal") may advantageously be used as communication device 2, provided that it has a touch surface and benefits from the module MIBC2, after a simple update of the software of the reader (installation and/or update of the application and configuration of the NFC transmission) to give it the ability to transmit a message having the IBC characteristics (frequency, modulation, etc.) via its antenna.

Figure 4:
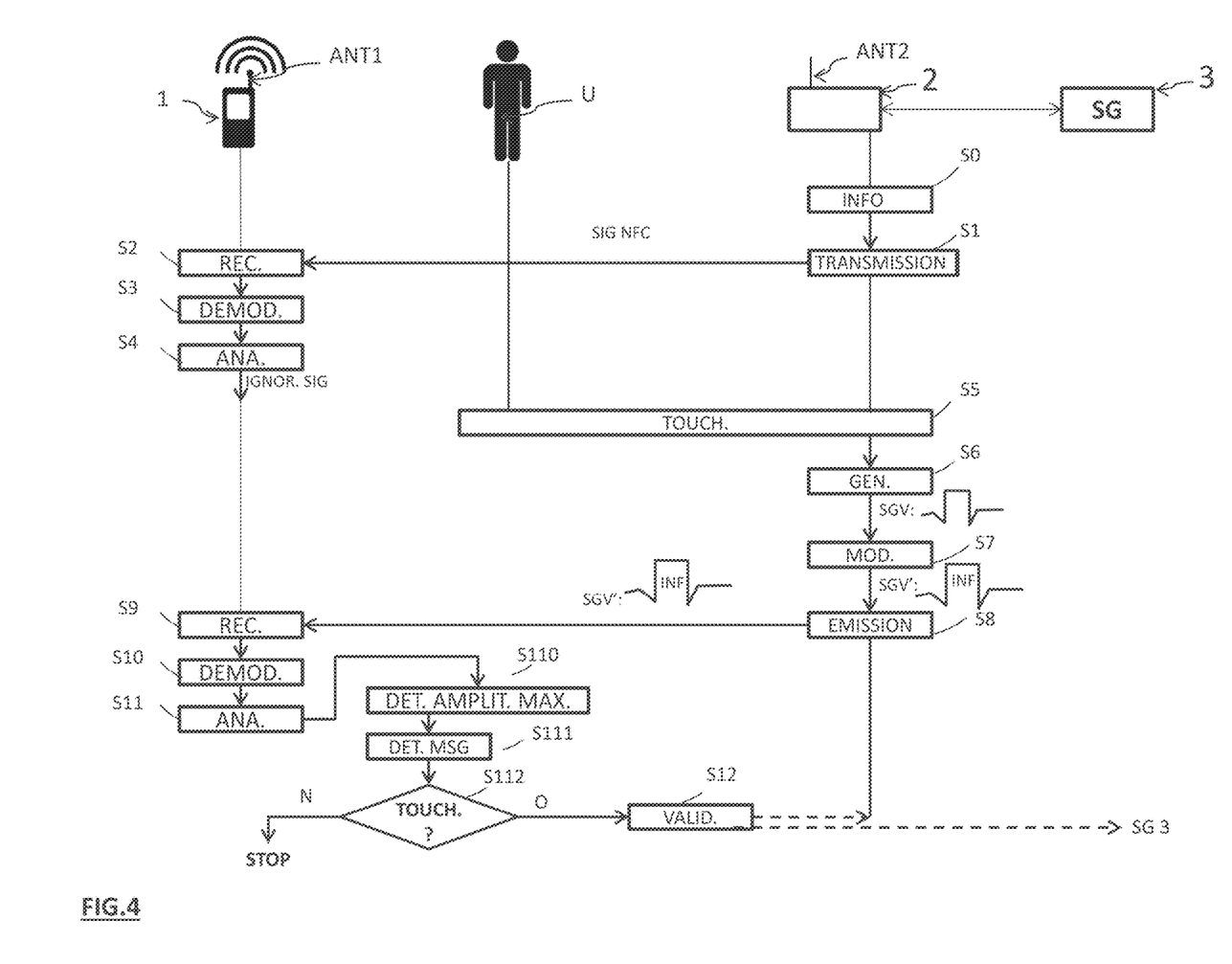
FIG. 4 shows the main actions implemented in the signal transmission/reception method, according to one particular embodiment of the invention.

Description of One Embodiment of a Bidirectional Wireless Intra-Body Communication Method With reference to FIG. 4, a description is now given of the sequence of a bidirectional wireless communication method through the human body of a user U, between the abovementioned terminal 1 and the abovementioned communication device 2, according to one embodiment of the invention.

In an initial step S0, in response to the approach of the user U toward the device 2, the device 2 renders information to the user U. According to one particular embodiment, this may be an information message, such as for example: "to validate the amount of the transaction, please touch or approach the sensitive surface SUT", "to validate access to the library, please touch or approach the sensitive surface SUT", etc. Such an information message may be rendered in text form and/or vocally.

In S1, the device 2 transmits, via its antenna ANT2, an NFC-type modulated electrical signal associated with a search message intended for a device located close to the device 2, in this case the terminal 1 carried by the user U. Such a signal, denoted by the reference SIG in FIG. 4, conventionally contains a default data frame along with a payload containing for example a random number, a code, a key, etc. This frame constitutes a search message transmitted in the signal SIG transmitted by the device 2, which is intended, according to this example, to come into contact with a portable device located close to the device 2. It is specific to the proposed transaction service: payment, access to a room, etc.

The signal SIG may be transmitted continuously for a predefined duration.

At the end of this transmission duration, the device 2 changes to reception mode.

In S2, the signal SIG transmitted in S1 is detected and received by the terminal 1.

In S3, the terminal 1 demodulates the received signal SIG into a digital signal.

In S4, the terminal 1 analyzes the digital signal thus obtained, via the module ANA of FIG. 2. During this analysis, the terminal 1 detects at least one of the information elements corresponding to the interrogation of the device 2, specifically, in this example, a service using IBC technology. Since the application APP does not at this stage detect any information relating to an intentional gesture performed by the user U with respect to the device 2, the signal SIG is ignored by the terminal 1.

The method according to the invention then proceeds as follows:

In S5, the user U touches the sensitive surface SUT of the device 2, for example by placing his hand thereon or by approaching his hand to within a few centimeters of the surface.

In S6, the device 2 generates an electrical signal SGV representative of the intentional gesture performed by the user U.

Figure 5:
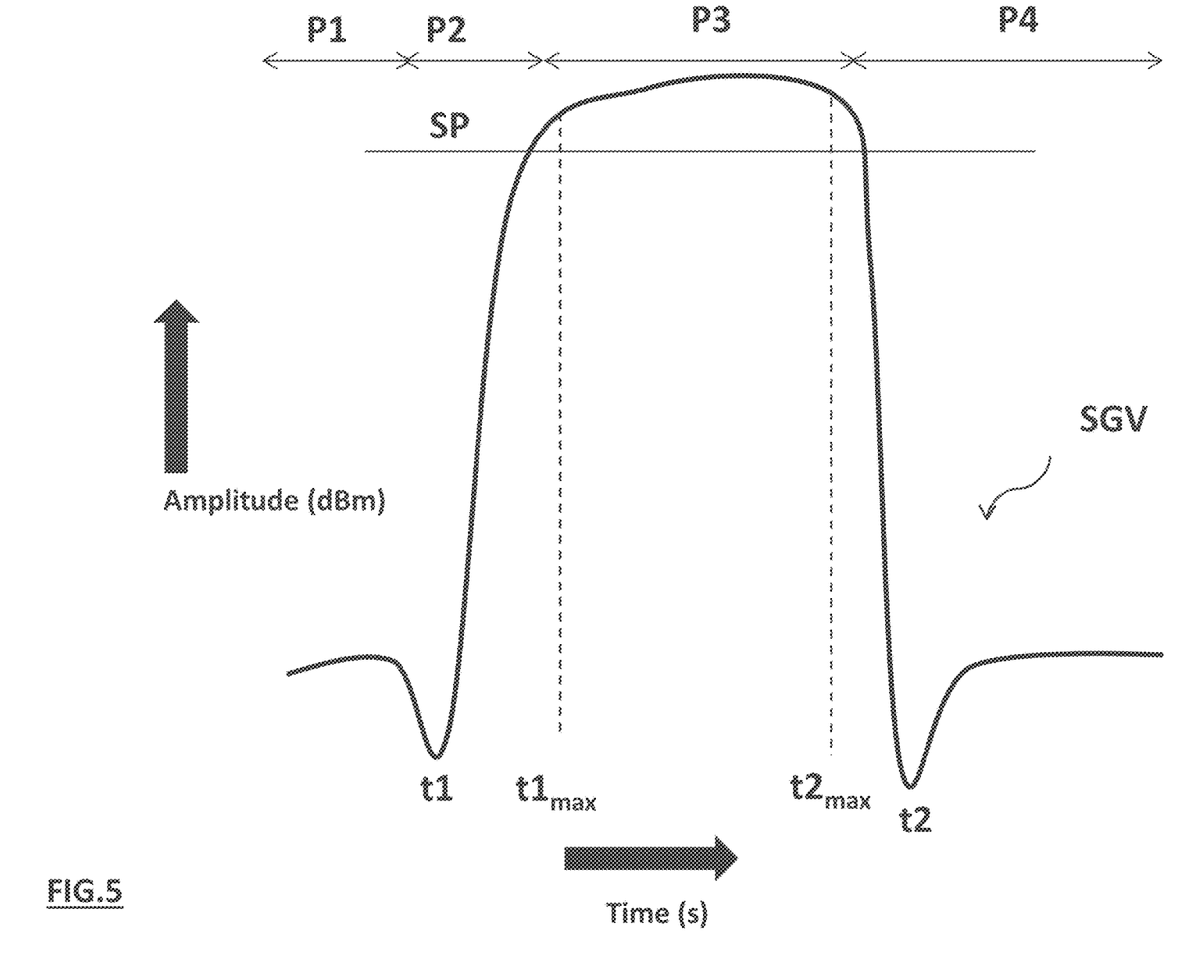
FIG. 5 shows one embodiment of a signal representative of an approach gesture performed by a user toward a communication device according to the invention.

In FIG. 5, the signal SGV comprises:
a first portion P1, characterizing the fact that the user U has not yet touched or approached very close to the sensitive surface SUT of the device 2. To this end, the power or the amplitude of the signal SGV is low, for example of the order of −70 dB;
a second portion P2, characterizing the fact that the user U has touched or approached very close to the sensitive surface SUT of the device 2. To this end, the signal SGV increases sharply until it reaches an amplitude of the order of for example −50 dB, at a time $t1_{max}$;
a third portion P3, characterizing the duration for which the user U remains in contact or in quasi-contact with the sensitive surface SUT of the device 2. To this end, the signal SGV reaches a maximum amplitude of the order of −50 dB until a time $t2_{max}$;
a fourth portion P4, characterizing the fact that, at $t2_{max}$, the user U has stopped touching or approaching very close to the sensitive surface SUT of the device 2. To this end, the signal SGV decreases sharply until it reaches an amplitude of the order of −70 dB.

With reference again to FIG. 4, in S7, the device 2 modulates the signal SGV by associating information INF therewith determining whether or not the user U has touched (or almost touched) the surface SUT of the device 2 between the times $t1_{max}$ and $t2_{max}$. By way of non-exhaustive example, such information is coded by the module COD of FIG. 3 on one bit, either at 1, determining that the user U has touched or almost touched the surface SUT of the device 2, or at 0, determining that the user U has not touched or almost touched the surface SUT of the device 2.

Of course, the information INF could be in text form, in alphanumeric form, etc. A modified signal SGV, denoted SGV', is then obtained at the end of S7.

In the example shown, the module COD of the device 2 generates the information INF at 1 because the user U has touched or almost touched the surface SUT.

In S8, the device 2 transmits, via its antenna ANT2, a modulated electrical signal SGV' associated with a message MSG for validating or not validating the gesture performed by the user U, intended for the terminal 1 carried by the user U. The message MSG transmitted in the modulated electrical signal SGV' transmitted by the device 2 comprises an identifier ID associated with the device 2, along with the information INF determining whether or not the user U has touched (or almost touched) the surface SUT of the device 2 between the times $t1_{max}$ and $t2_{max}$.

The identifier ID is a unique reference associated with the device 2 or else a location identifier for identifying the location of the device 2 (GPS coordinates, URL address, etc.).

The message MSG is in the form of a single data frame containing:
the identifier ID of the communication device 2,
a bit at 1 or at 0, depending on whether or not the user U has touched (or almost touched) the surface SUT of the device 2 between the times $t1_{max}$ and $t2_{max}$.

Other information may be contained in the data frame, such as for example a service identifier and/or else a random datum.

As an alternative, the message MSG comprises:
a first data frame containing the information INF at 1 or at 0, depending on whether or not the user U has touched (or almost touched) the surface SUT of the device 2 between the times $t1_{max}$ and $t2_{max}$;
a second data frame containing the identifier ID of the communication device 2 and possibly the other information, such as for example a service identifier and/or else a random datum.

The identifier ID may be supplied by the device 2, which has stored it locally, or else upon request from a management system SG 3 connected to the device 2 via a communication network.

As a variant, the information INF may also be generated by the management system 3 upon the request of the device 2 in order to unburden the computing resources thereof.

In S9, the modulated electrical signal SGV' transmitted in S8 is detected and received by the terminal 1, via the body of the user U, passing through the antenna ANT1.

In S10, the terminal 1 demodulates the received electrical signal SGV' into a digital signal, via its module DEMOD (FIG. 2).

In S11, the terminal 1 analyzes the digital signal thus obtained, via its module DGV (FIG. 2), in order to validate whether or not the gesture performed by the user U corresponds to an intentional gesture on the part thereof and whether or not the surface SUT of the device 2 has been touched (or almost touched) by the user U. During this analysis, the terminal 1 detects, in S110, that the amplitude of the signal SGV' is at a maximum between the times $t1_{max}$ and $t2_{max}$ and that the signal SGV' has exceeded a predetermined threshold SP between these two times. A first condition according to which the signal SGV' is representative of an approach gesture performed by the user U toward the device 2 is therefore met.

In S111, based on the obtained digital signal, the terminal 1 detects the abovementioned message MSG, that is to say the information INF, the identifier ID of the device 2 and possibly the other abovementioned information, such as for example a service identifier and/or else a random datum.

In S112, the terminal 1 then checks, via its module ANA, whether the information INF is at 0 or at 1.

If INF is at 0, the additional condition for validating the intentional approach gesture performed by the user U is not met since the value, at 0, of the information INF is representative of the fact that the user U has not touched the touch surface SUT of the device 2 corresponding to the detected identifier ID. The terminal 1 therefore does not continue the transaction.

If INF is at 1, as in the example shown, the additional condition for validating the intentional approach gesture performed by the user U is met since the value, at 1, of the information INF is representative of the fact that the user U has touched or almost touched the touch surface SUT of the device 2 corresponding to the detected identifier ID.

In S12, the terminal 1 then validates the content of the message MSG in a conventional manner, and then enters into communication either with the device 2 if the latter has sufficient management capabilities or else with the management system SG 3 or any other appropriate management equipment, in order to activate the service required by the terminal 1 (validate the amount of a transaction, validate access to a room, validate a balance of transport tickets, etc.).

The invention claimed is:

1. A reception method for receiving a signal during an intra-body communication via a user carrying a terminal, comprising the following, performed by the terminal:
receiving the signal from a communication device, the signal characterizing that an approach gesture performed by the user toward the device has been performed between first and second time instants;
from the received signal, detecting a time interval, between the first and second time instants, in which an amplitude of the signal is at a maximum;
from the received signal, detecting, in the time interval, information determining whether or not the user has touched the device between the first and second time instants; and
validating a transaction depending on a value of said detected information,
wherein the information determining whether or not the user has touched the communication device consists of binary information of a single bit length, wherein a first value of said single bit determines that the user has touched the communication device, and a second value of said single bit determines that the user has not touched the communication device.

2. The reception method as claimed in claim 1, wherein the information determining whether or not the user has touched the device is contained in a radio data frame received from the communication device, said frame being associated with the time interval in which the amplitude of the signal is at a maximum.

3. The reception method as claimed in claim 1, wherein the information determining whether or not the user has touched the device is contained in a radio data frame received from the communication device, said frame being associated with the time interval in which the amplitude of the signal is at a maximum, and wherein said frame is distinct from another radio data frame received from the communication device and associated with the time interval in which the amplitude of the signal is at the maximum.

4. A terminal having capabilities for intra-body communication via a user carrying said terminal, said terminal comprising:
a processor that is configured so as to:
receive a signal from a communication device, the signal characterizing that an approach gesture performed by the user toward the device has been performed between first and second time instants,
from the received signal, detect the time interval, between the first and second time instants, in which an amplitude of the signal is at a maximum,
from the received signal, detect, in the time interval, information determining whether or not the user has touched the device between the first and second time instants,
validate a transaction depending on a value of said detected information,
wherein the information determining whether or not the user has touched the communication device consists of binary information of a single bit length, wherein a first value of said single bit determines that the user has touched the communication device, and a second value of said single bit determines that the user has not touched the communication device.

5. The terminal as claimed in claim 4, wherein the information determining whether or not the user has touched the device is contained in a radio data frame received from the communication device, said frame being associated with the time interval in which the amplitude of the signal is at a maximum.

6. The terminal as claimed in claim 4, wherein the information determining whether or not the user has touched the device is contained in a radio data frame received from the communication device, said frame being associated with the time interval in which the amplitude of the signal is at a maximum, and wherein said frame is distinct from another radio data frame received from the communication device and associated with the time interval in which the amplitude of the signal is at the maximum.

7. A non-transitory computer-readable information medium comprising instructions of a computer program stored thereon, which when executed by a processor of a terminal, configure the terminal to perform a method for receiving a signal during an intra-body communication via a user carrying the terminal, wherein the method comprises:
receiving the signal from a communication device, the signal characterizing that an approach gesture performed by the user toward the device has been performed between first and second time instants;
from the received signal, detecting a time interval, between the first and second time instants, in which an amplitude of the signal is at a maximum;

from the received signal, detecting, in the time interval, information determining whether or not the user has touched the device between the first and second time instants; and validating a transaction depending on a value of said detected information, wherein the information determining whether or not the user has touched the communication device consists of binary information of a single bit length, wherein a first value of said single bit determines that the user has touched the communication device, and a second value of said single bit determines that the user has not touched the communication device.

8. The non-transitory computer-readable information medium as claimed in claim 7, wherein the information determining whether or not the user has touched the device is contained in a radio data frame received from the communication device, said frame being associated with the time interval in which the amplitude of the signal is at a maximum.

9. The non-transitory computer-readable information medium as claimed in claim 7, wherein the information determining whether or not the user has touched the device is contained in a radio data frame received from the communication device, said frame being associated with the time interval in which the amplitude of the signal is at a maximum, and wherein said frame is distinct from another radio data frame received from the communication device and associated with the time interval in which the amplitude of the signal is at the maximum.

* * * * *